US008892085B2

(12) United States Patent
Kitaya

(10) Patent No.: US 8,892,085 B2
(45) Date of Patent: Nov. 18, 2014

(54) MOBILE INFORMATION APPARATUS AND MANNER MODE SHIFTING PROGRAM

(71) Applicant: KYOCERA Corporation, Kyoto (JP)

(72) Inventor: Kouki Kitaya, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/728,902

(22) Filed: Dec. 27, 2012

(65) Prior Publication Data
US 2013/0122886 A1 May 16, 2013

Related U.S. Application Data

(63) Continuation of application No. 12/680,177, filed as application No. PCT/JP2008/002688 on Sep. 26, 2008, now Pat. No. 8,355,705.

(30) Foreign Application Priority Data

Sep. 28, 2007 (JP) ................................ 2007-255820

(51) Int. Cl.
H04M 3/00 (2006.01)
H04M 19/04 (2006.01)
H04M 1/725 (2006.01)
H04W 8/18 (2009.01)
H04M 3/42 (2006.01)

(52) U.S. Cl.
CPC .............. *H04W 8/183* (2013.01); *H04M 19/04* (2013.01); *H04M 1/72566* (2013.01); *H04M 1/72572* (2013.01); *H04M 3/42153* (2013.01)
USPC ........ 455/418; 455/419; 455/414.1; 455/567; 455/550.1

(58) Field of Classification Search
CPC ............ H04M 19/04; H04M 1/72566; H04M 1/72572; H04M 3/42153; H04W 8/183
USPC ........................ 455/418, 419, 414.1, 567, 550
See application file for complete search history.

(56) References Cited

U.S. PATENT DOCUMENTS

| | | | |
|---|---|---|---|
| 6,934,536 B2* | 8/2005 | Yoshioka | ....................... 455/418 |
| 2002/0032040 A1* | 3/2002 | Tsukamoto | ................... 455/556 |

(Continued)

FOREIGN PATENT DOCUMENTS

| | | | |
|---|---|---|---|
| JP | 2000-286927 A | 10/2000 |
| JP | 2001-189774 A | 7/2001 |
| JP | 2001-251395 A | 9/2001 |
| JP | 2002-232960 A | 8/2002 |

(Continued)

OTHER PUBLICATIONS

Decision on Refusal dated Oct. 30, 2012, issued in counterpart Japanese Application No. 2009-534188.

(Continued)

*Primary Examiner* — Khai M Nguyen
(74) *Attorney, Agent, or Firm* — Procopio, Cory, Hargreaves & Savitch LLP

(57) ABSTRACT

Memory 42 stores conditions (schedule, position, and travel condition) for triggering switching to a manner mode. When any of the conditions is met, a CPU 33 requests a user for an instruction as to whether or not to switch to the manner mode according to the condition stored in the memory 42. In response to a user instruction for approvable of the switching to the manner mode, the CPU 33 executes control to switch the mobile phone to the manner mode.

4 Claims, 23 Drawing Sheets

(56) References Cited

U.S. PATENT DOCUMENTS

| | | |
|---|---|---|
| 2002/0123329 A1 | 9/2002 | Murray |
| 2003/0186662 A1 | 10/2003 | Himmel et al. |
| 2006/0079201 A1* | 4/2006 | Chung et al. ............... 455/410 |
| 2006/0156209 A1* | 7/2006 | Matsuura et al. ............ 714/798 |
| 2007/0026889 A1 | 2/2007 | Yamauchi et al. |
| 2007/0037605 A1* | 2/2007 | Logan ........................ 455/567 |
| 2007/0082712 A1* | 4/2007 | Ikeda et al. ................. 455/567 |
| 2007/0109917 A1* | 5/2007 | Um et al. ..................... 368/73 |
| 2008/0051035 A1* | 2/2008 | Zhang et al. ............... 455/67.11 |
| 2009/0023482 A1 | 1/2009 | Koura et al. |

FOREIGN PATENT DOCUMENTS

| | | |
|---|---|---|
| JP | 2006-287898 A | 10/2006 |
| JP | 2006-352789 A | 12/2006 |
| JP | 2007-151106 A | 6/2007 |

OTHER PUBLICATIONS

Office Action dated Jul. 17, 2012, issued in counterpart Japanese Application No. 2009-534188.

International Search Report issued for International Application No. PCT/JP2008/002688, Nov. 18, 2008.

* cited by examiner

FIG. 4

| NO. | Start date & time | End date & time | Plan | Place | Manner mode switch flag |
|---|---|---|---|---|---|
| 1 | 9/25 15:00 | 9/25 16:00 | Progress meeting | Meeting room A | ON |
| 2 | 9/26 10:00 | 9/26 11:30 | Group meeting | Meeting room B | OFF |
| 3 | ... | ... | ... | ... | ... |

FIG. 5

| NO. | Latitude/longitude | Place | Manner mode switch flag |
|---|---|---|---|
| 1 | Lat. 34° 42' 44" N  Long. 135° 37' 2" E | Office | ON |
| 2 | Lat. 35° 40' 51" N  Long. 139° 46' 1" E | Station | OFF |
| 3 | ... | ... | ... |

FIG. 6

| NO. | Traveling velocity | Duration | Situation | Manner mode switch flag |
|---|---|---|---|---|
| 1 | 40km/h and more | 1 min | Traveling on bike | ON |
| 2 | 80km/h and more | 2 min | Traveling on train | ON |
| 3 | ... | ... | ... | ... |

FIG. 16

|  | Silent-vibration | Drive | Original manner 1 | Original manner 2 |
|---|---|---|---|---|
| Ringtone volume | OFF | OFF | OFF | OFF |
| Vibrator | ON | OFF | ON | OFF |
| Alarm volume | OFF | OFF | OFF | OFF |
| Sound effect volume | OFF | OFF | OFF | OFF |
| Voice notifier volume | Notify with vibration | Notify with vibration | Notify with vibration | Notify with vibration |
| Easy message memo | ON | ON | OFF | OFF |
| Low-voltage alarm | OFF | OFF | OFF | OFF |

MOBILE INFORMATION APPARATUS AND MANNER MODE SHIFTING PROGRAM

CROSS REFERENCE TO RELATED APPLICATIONS

The present application is a continuation of U.S. patent application Ser. No. 12/680,177, filed on May 7, 2010, which is the U.S. National Stage Application of PCT/JP2008/002688, filed on Sep. 26, 2008, and claims the benefit of Japanese Application No. 2007-255820, filed on Sep. 28, 2007, each of which is incorporated herein by reference in its entirety.

TECHNICAL FIELD

The present invention relates to a mobile information apparatus having the function of manner modes including a drive mode and a sleep mode.

BACKGROUND ART

Conventionally, a mobile phone, which is a typical example of a mobile information apparatus, notifies the user about an incoming call or mail by sounding a ringtone. However, a ringtone may be annoying to other people especially in a movie theater, on a train, and during a meeting. Further, while the user is driving, a ringtone may become a source of driver inattention, which results in the risk of a car accident. In order to address the problems noted above, mobile phones are provided with the function of manner modes, which may be referred to also as silent modes. For a manner mode, various settings are made in advance regarding the ringtone volume level and the vibration level of the vibrator. The user can place the mobile phone into a manner mode by operating a predetermined key. Usually, the user is required to operate keys each time to place the mobile phone into a manner mode. In order to reduce the user's trouble of making such key operations, a technique is suggest to automatically switch the mobile phone to a manner mode according to the user's schedule (See Patent Document 1, for example). [Patent Document 1] JP 2001-189774-A

DISCLOSURE OF INVENTION

Technical Problem

However, the automatic switching to a manner mode according to the preset schedule involves the risk that the mobile phone is placed into the manner mode despite that a change has been made to the schedule. In such a case, there are various undesirable possibilities. For example, the user may be unaware that the mobile phone is placed in the manner mode and unintentionally keeps the mobile phone in the manner mode. Even if the user finds out about the situation, it is required to make a key operation to cancel the manner mode.

Technical Solution

One aspect of the present invention provides a mobile information apparatus having: a storage unit operable to store a condition for triggering switching to a manner mode; a request unit operable to request an instruction as to whether or not to perform the switching to the manner mode according to the condition stored in the storage unit; a receiving unit operable to receive an instruction given by a user in response to the request by the request unit; and a control unit operable to control the switching to the manner mode when the instruction received by the receiving unit instructs the switching to the manner mode.

Another aspect of the present invention provides a manner mode switching program to be executed by a mobile information apparatus having a storage unit storing a condition for triggering switching to a manner mode. The manner mode switching program including code operable to cause the mobile information apparatus to perform: requesting an instruction as to whether or not to perform the switching to the manner mode according to the condition stored in the storage unit; receiving an instruction given by a user in response to the request made in the requesting step; and controlling the switching to the manner mode when the instruction received in the receiving step instructs the switching to the manner mode.

Advantageous Effects

The mobile information apparatus and the manner mode switching program ensure the following. That is, before going into a manner mode, the mobile information apparatus requests the user to give an instruction to switch to the manner mode. The control for switching the mobile information apparatus to the manner mode is executed in response to the user instruction to do so. With this configuration, it is avoided that the manner mode is activated without the user being aware of the mode switching. Further, since the automatic switching to the manner mode does not take place, the user is saved from having to make a key operation for canceling the manner mode that has been automatically activated.

BRIEF DESCRIPTION OF DRAWINGS

FIG. 4 is a view showing one example of a schedule management table stored in the memory shown in FIG. 3;

FIG. 5 is a view showing one example of a position management table stored in the memory shown in FIG. 3;

FIG. 6 is a view showing one example of a travel condition management table stored in the memory shown in FIG. 3;

FIG. 16 is a view showing one example of a function management table stored in memory of a mobile phone consistent with a second embodiment;

EXPLANATION OR REFERENCE

1 Mobile Phone
2 Upper Casing
3 Hinge Part
4 Lower Casing
5 Main Display
6 Sub-Display
6a Touch Sensor
7 Speaker
8 Operation Unit
9 Microphone
10 Side Key
31 Antenna
32 Wireless Communication Circuit
33 CPU
34 Battery
35 Power Circuit
36 GPS Antenna
37 GPS Signal Processing Circuit
38 Clock Circuit
39 Timer Circuit
40 Acceleration Sensor
41 Vibrator
42 Memory

[Best Mode For Carrying Out the Invention]

The following describes embodiments of the present invention with reference to the drawings. Note that first to third embodiments describe below are directed to a mobile phone, which is a typical example of a mobile information apparatus. However, it is naturally appreciated that the present invention is applicable to various types of mobile information apparatuses other than a mobile phone.

<<First Embodiment>>

The following describes a mobile phone consistent with the first embodiment of the present invention with reference to the drawings.

<External Appearance of Mobile Phone>

Figure 1A:
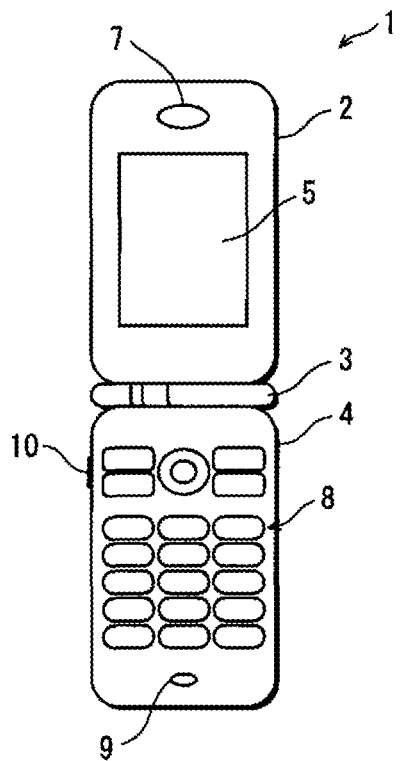
FIG. 1A is a front view of a mobile phone consistent with a first embodiment.
Figure 1B:
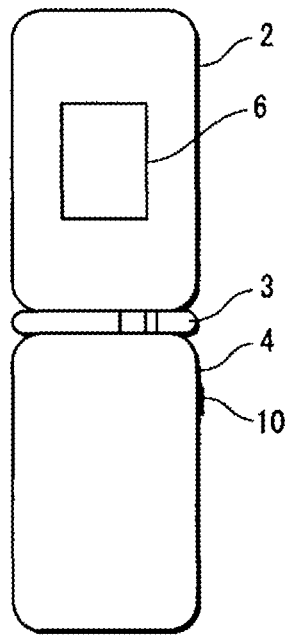
FIG. 1B is a rear view of the mobile phone.

The following describes the external appearance of a mobile phone 1 consistent with the present embodiment, with reference to FIG. 1. FIG. 1 show one example of the external appearance of the mobile phone 1. More specifically, FIG. 1A is a front view and FIG. 1B is a rear view of the mobile phone being in an open-state.

The mobile phone 1 is mainly composed of an upper casing 2 and a lower casing 4 that are connected together with a hinge part 3. The upper casing 2 includes a main display 5, a sub-display 6, and a speaker 7. The sub-display 6 is provided with a touch sensor disposed to cover a surface thereof (a touch sensor 6a shown in FIG. 3). The lower casing 4 is provided with a plurality of keys and has an operation unit 8 and a microphone 9. The operation unit 8 has a side key 10.

Figure 2:
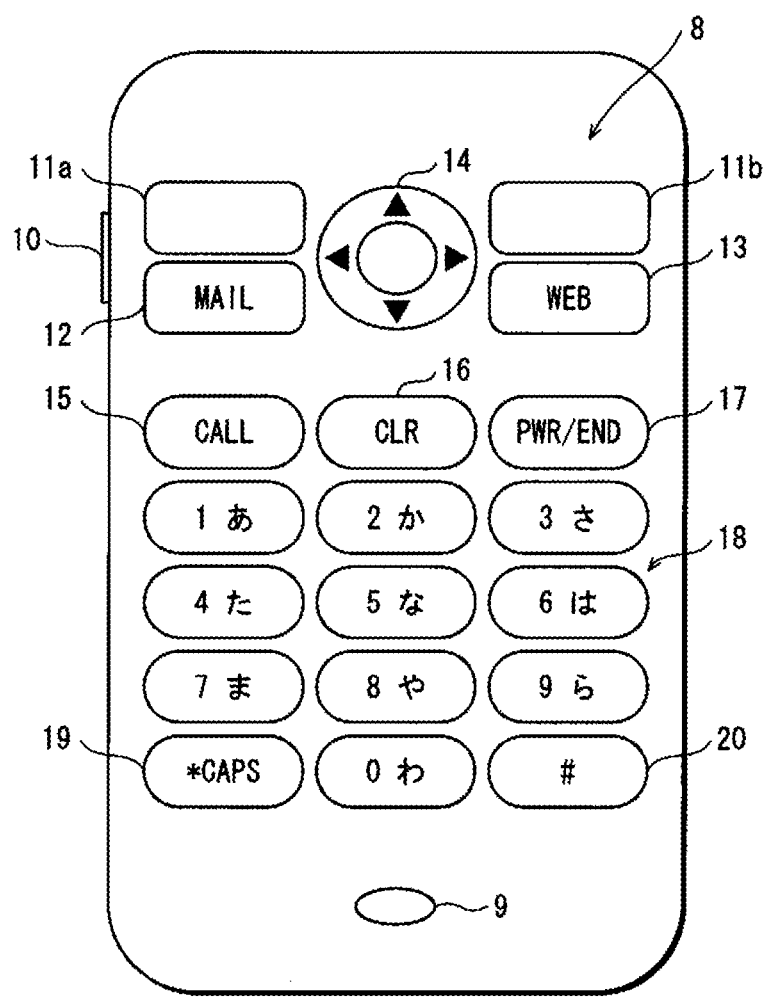
FIG. 2 is a front view of a lower casing of the mobile phone shown in FIG. 1.

With reference to FIG. 2, the following describes the details of the operation unit 8 included in the lower casing 4 shown in FIG. 1. FIG. 2 is a front view of the lower casing 4 of the mobile phone 1 shown in FIG. 1.

The operation unit 8 includes the side key 10 provided on a side surface of the lower casing 4. Further, the operation unit 8 additionally includes soft keys 11a and 11b, a MAIL key 12 for invoking the mail function, a WEB key 13 for invoking the Web function, and a cross key 14 associated with up/down/left/right directional inputs for moving a cursor or for scrolling display. Further, the operation unit 8 additionally includes a TALK key 15 for dialing (placing a call) and answering an incoming call (off-hook), a clear (CLR) key 16 for clearing text having been input in a text input mode and for going back to an immediately previous screen, and power (PWR) key 17 for ending a call and for power ON/OFF. Further, the operation unit 8 is associated with numbers 0-9 and characters (alphabetic characters and characters of Japanese Hiragana alphabet) and includes a ten key 18, an asterisk (*) key 19, and a number sign (#) key 20 used to input associated numbers and characters.

<Functions of Mobile Phone>

Figure 3:
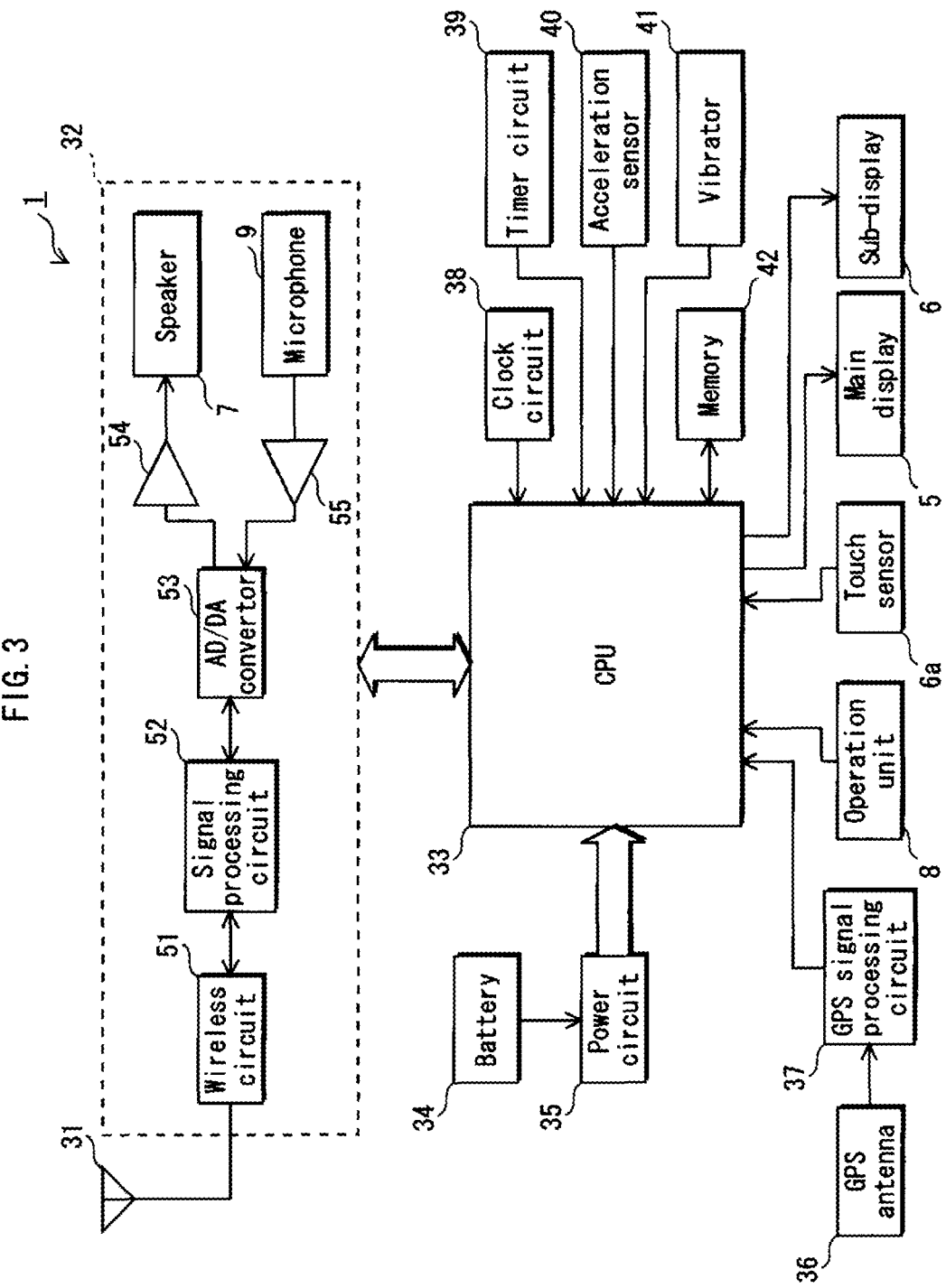
FIG. 3 is a functional block diagram of the mobile phone shown in FIG. 1.

The following describes the functions of the mobile phone 1 shown in FIG. 1, with reference to FIG. 3. FIG. 3 is a functional block diagram of the mobile phone 1 shown in FIG. 1.

The mobile phone 1 includes an antenna 31, a wireless communication circuit 32, a CPU (Central. Processing Unit) 33, a battery 34, a power circuit 35, a GPS (Global Positioning System) antenna 36, a GPS signal processing circuit 37, the operation unit 8, the touch sensor 6a, the main display 5, the sub-display 6, a clock circuit 38, a timer circuit 39, an acceleration sensor 40, a vibrator 41, and memory 42.

The wireless communication circuit 32 includes a wireless circuit 51, a signal processing circuit 52, an AD/DA convertor 53, amplifiers 54 and 55, the speaker 7, and the microphone 9.

The mobile phone 1 is wirelessly connected to a base station and receives audio data with the antenna 31. The wireless circuit 51 demodulates the audio data received with the antenna 31. The signal processing circuit 52 conducts signal processing on the demodulated audio data. The AD/DA convertor 53 converts the processed audio data into an analog audio signal. The amplifier 54 amplifies the analog audio signal. The speaker 7 produces audio output based on the amplified signal.

Also, when the user of the mobile phone 1 emits some sounds toward the microphone 9, the mobile phone 1 collects an audio signal with the microphone 9. The amplifier 55 amplifies the audio signal collected by the microphone 9. The AD/DA convertor 53 converts the amplified audio signal into a digital signal carrying audio data. The signal processing circuit 52 codes the audio data. The wireless circuit 51 modulates the coded audio data. The modulated audio data is then transmitted from the antenna 31.

The CPU 33 carries out various controls and computations for the mobile phone 1. For example, the CPU 33 reads programs for executing the operational flows shown in FIGS. 7, 8, 13, and 14 from the memory 42 and executes the read programs.

The power circuit 35 supplies power from the battery 34 to the various units of the mobile phone 1. Note that the battery 34 may be a lithium-ion battery or any other battery. The GPS antenna 36 receives radio waves from artificial satellites each of which orbits around the earth. Based on the radio waves received with the GPS antenna 36, the GPS signal processing circuit 37 calculates the current position (the latitude and longitude) and the traveling velocity of the mobile phone 1 and outputs the values of the calculated position and traveling velocity to the CPU 33.

The operation unit 8 outputs to the CPU 33 a touch signal indicative of a key touched or pressed by the user. Under control of the CPU 33, each of the main display 5 and the sub-display 6 displays appropriate data. More specifically, the main display 5 and the sub-display 6 display a menu screen, mail, Web information, and still/video images captured by a camera. In addition, during execution of the operational flow shown in FIG. 8, the following screens are appropriately displayed one by one on the main display 5. That is, one is a screen for allowing the user to select an item to be set, out of the plurality of items (schedule, position, and travel condition) of the conditions for triggering the switching to the manner mode (hereinafter, referred to as a "condition setting screen"). Another is a screen for registering a schedule for triggering the switching to the manner mode (hereinafter, referred to as a "schedule registration screen"). Yet another is a screen for registering a position at which the mobile phone 1 is triggered to switch to the manner mode (hereinafter, referred to as a "position registration screen"). Yet another is a screen for registering a travel condition for triggering the switching to the manner mode (hereinafter, referred to as a "travel condition setting screen"). In addition, during execution of the operational flow shown in FIG. 14, the main display 5 appropriately displays a screen for allowing the user to instruct whether or not to switch the mobile phone 1 into the manner mode (hereinafter, referred to as a "manner mode switching screen"). Each screen will be described later in more detail. Note that each of the main display 5 and the sub-display 6 is composed of an LCD (Liquid Crystal Display) or an organic EL display (Organic Electroluminescence Display), for example.

The touch sensor 6a is disposed to cover the sub-display 6 and configured to output to the CPU 33 a signal indicative of the coordinates locating a touch by a dielectric, such as a finger of the user. Note that the touch sensor 6a is not limited to any specific type and may be a capacitive sensor or a pressure sensor, as long as the sensor is capable of detecting the location of a touch by a finger or a pen.

The clock circuit 38 keeps time and outputs the current time to the CPU 33. The timer circuit 39 is a component that measures a predetermined duration of time. The acceleration sensor 40 is, for example, a triaxial acceleration sensor and outputs acceleration values measured in three axial directions to the CPU 33. The vibrator 41 vibrates under control by the CPU 33.

The memory 42 stores control programs for executing various controls of the mobile phone 1 as well as various application programs. In addition, the memory 42 stores programs for causing the mobile phone 1 to execute the operational flows shown in FIGS. 7, 8, 13, and 14. In addition, the memory 42 stores various pieces of data including still imaged data, moving image data, and music data. In addition, the memory 42 stores the following tables. One is a table for managing schedules and other details for triggering the switching to the manner mode (hereinafter, referred to as a "schedule management table"). Another is a table for managing positions and other details for triggering the switching to the manner mode (hereinafter, referred to as a "position management table"). Yet another is a table for managing travel conditions and other details for triggering the switching to the manner mode (hereinafter, referred to as a "travel condition management table"). In one example shown in FIG. 4, the schedule management table has the items of "NO.", "start date & time", "end date & time", "plan", "place", and "manner mode switch flag". In one example shown in FIG. 5, the position management table has the items of "NO.", "latitude/longitude", "place", and "manner mode switch flag". In one example shown in FIG. 6, the travel condition management table has the items of "NO.", "traveling velocity", "duration", "situation" and "manner mode switch flag". The contents and usage of each table will be described later. Note that the memory 42 is composed of ROM (Read Only Memory), RAM (Random Access Memory), nonvolatile memory or a hard disk, for example.

<Operation of Mobile Phone>

Figure 7:
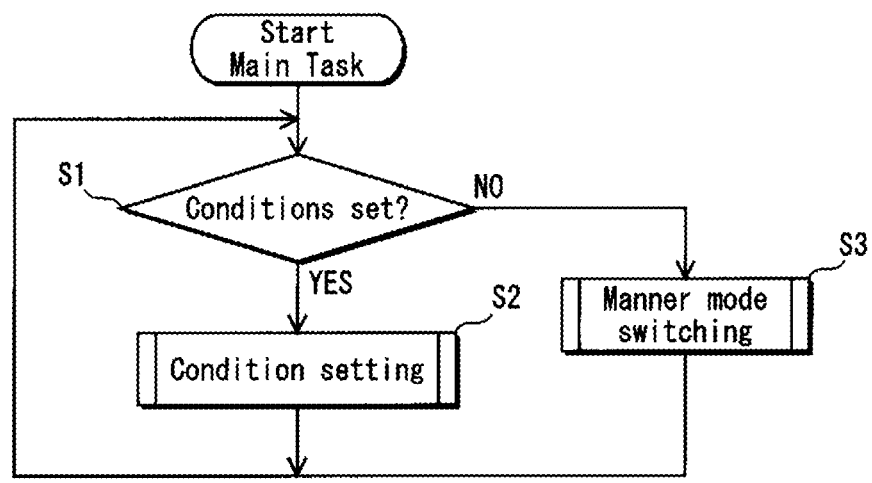
FIG. 7 is a flowchart showing the procedure of a mode switching process performed by the mobile phone shown in FIG. 1.

The following describes the mode switching process of the mobile phone 1 shown in FIG. 1, with reference to FIG. 7. FIG. 7 is a flowchart showing the procedure of the mode switching process performed by the mobile phone 1 shown in FIG. 1.

In the mobile phone 1, the CPU 33 judges, based on touch signals fed from the operation unit 8, whether or not a predetermined user operation is made to set any item (schedule, position, or travel condition) of the conditions for triggering the switching to the manner mode (Step S1). On judging that such an operation is made (S1: YES), the CPU 33 performs the condition setting process for setting the conditions for triggering the switching to the manner mode (Step S2). On the other hand, on judging that no such an operation is made (S1: NO), the CPU 31 performs the manner mode switching process to judge whether or not the mobile phone 1 is to be switched to the manner mode (Step S3).

[Condition Setting Process]

Figure 8:
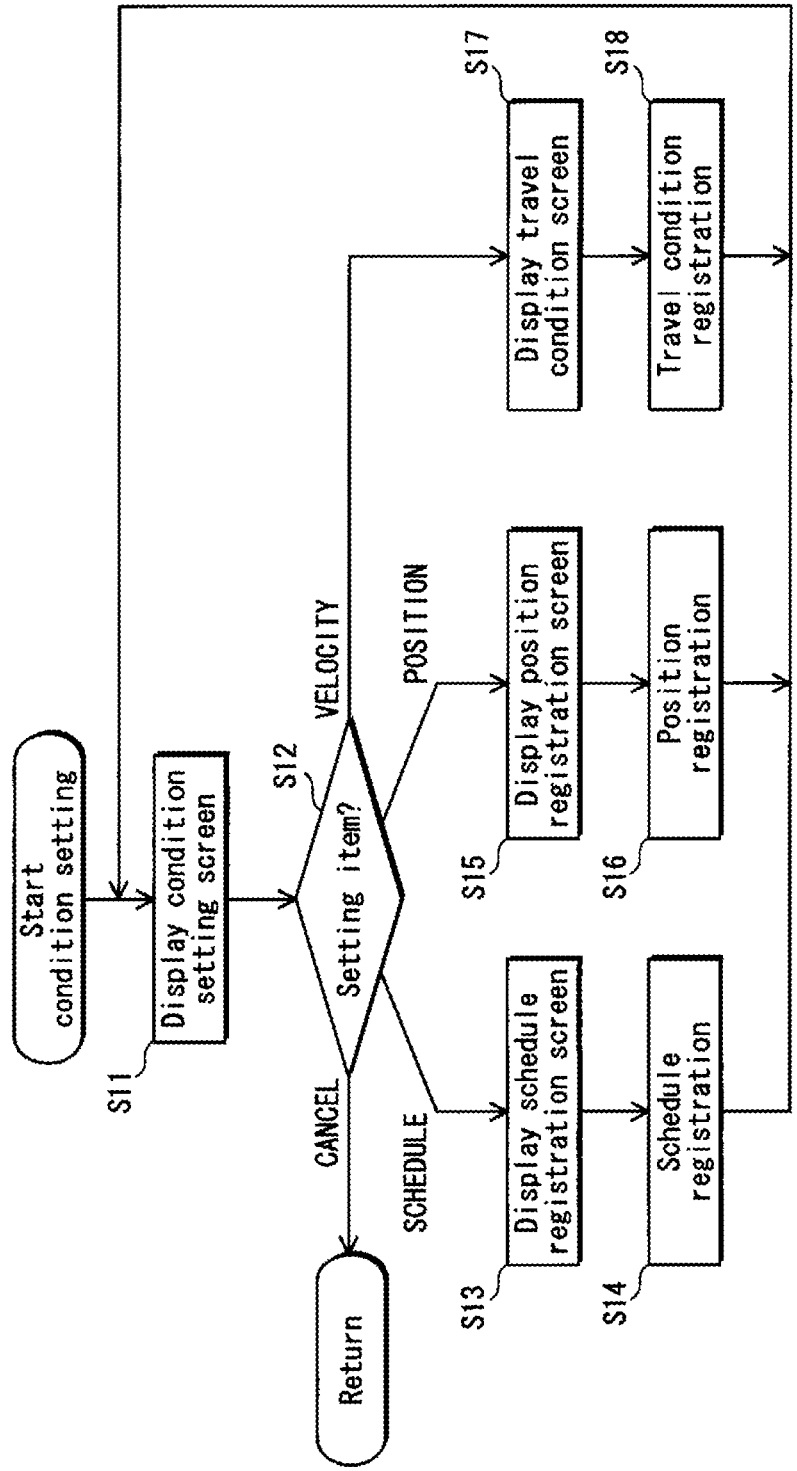
FIG. 8 is a flowchart showing the procedure of a condition setting process shown in FIG. 7.

The following describes the condition setting process (Step S2) shown in FIG. 7, with reference to FIG. 8. FIG. 8 is a flowchart showing the procedure of the condition setting process (Step S2) shown in FIG. 7.

Figure 9:
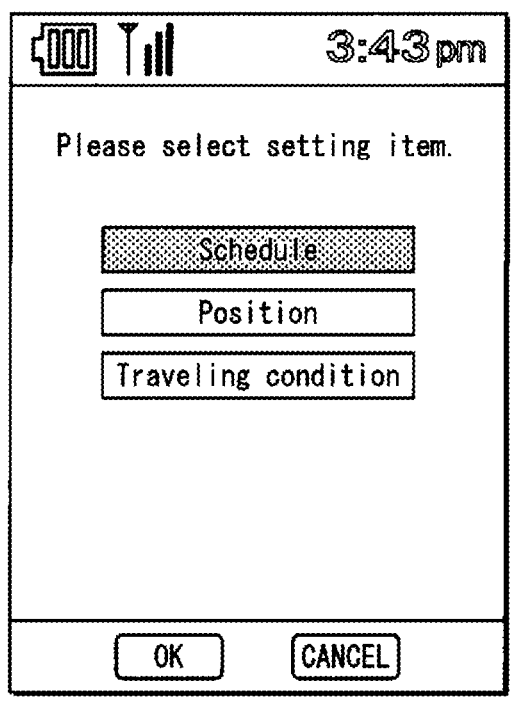
FIG. 9 is a view showing one example of a condition setting screen displayed on the main display shown in FIG. 1.

The CPU 33 displays the condition setting screen on the main display 5 (Step S11). The condition setting screen is for allowing the user to select an item to be set, out of the items (schedule, position, and travel condition) of the conditions for triggering the switching to the manner mode. As shown in FIG. 9, the condition setting screen displays the message reading "Please select setting item." Further, the condition setting screen includes "Schedule", "Position", and "Travel condition" buttons for the user to select the respective items of the conditions for triggering the switching to the manner mode. Further, "OK" and "CANCEL" buttons are additionally included.

Based on touch signals fed from the operation unit 8, the CPU 33 analyzes the user operations made on the condition setting screen (Step S12).

Figure 10:
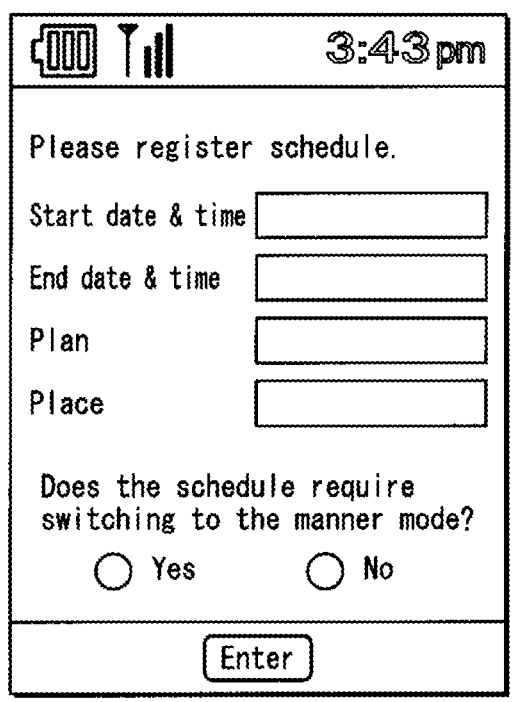
FIG. 10 is a view showing one example of a schedule registration screen displayed on the main display shown in FIG. 1.

If the user sequentially selects "schedule" and "OK" on the condition setting screen (S12: SCHEDULE), the CPU 33 displays the schedule registration screen on the main display 5 to allow the user to register a schedule (Step S13). As shown in FIG. 10, the schedule registration screen displays the message reading "Please register a schedule." The schedule registration screen additionally includes input fields for the start date & time of a plan to be scheduled, the end date & time of the plan, the details of the plan, and the place at which the plan is to be executed. The schedule registration screen additionally includes the message reading "Does the schedule require switching to the manner mode?" Further, the schedule registration screen additionally includes two radio buttons which are "YES" and "NO". The "YES" button is used instruct that the schedule being registered requires the switching to the manner mode. The "NO" button is used to instruct that the schedule being registered does not require the switching to the manner mode. The schedule registration screen additionally includes an "Enter" button. At a bush of the "Enter" button, the user can enter and register the inputs having made on this screen.

The CPU 33 detects that the user has made an operation for "registration", based on touch signals fed from the operation unit 8. Upon detection, the CPU 33 updates the schedule management table by storing the inputs made in the fields of "start date & time", "end date & time", "plan", and "place" into the corresponding items of the schedule management table. Further, the CPU 33 sets the manner mode switch flag to ON if the "YES" button is selected and to OFF if the "NO" button is selected (Step S14). The CPU 33 then goes back to Step S11.

Figure 11:
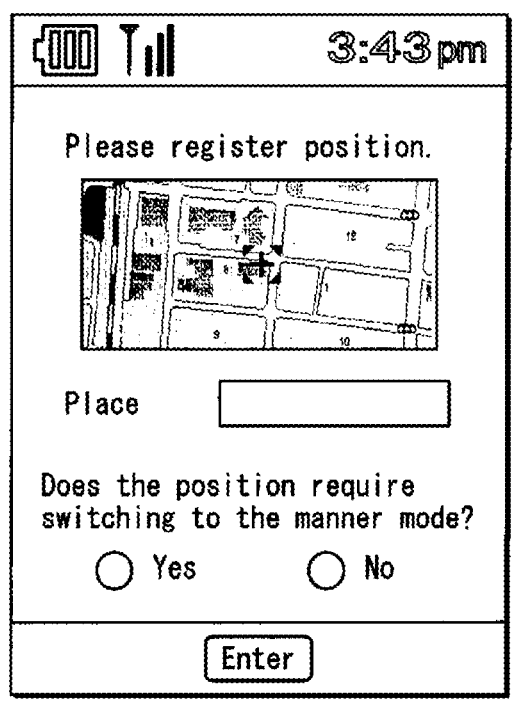
FIG. 11 is a view showing one example of a position 1.

If the user sequentially selects "position" and "OK" on the condition setting screen (S12: POSITION), the CPU 33 displays the position registration screen on the main display 5 to allow the user to register a position (Step S15). As shown in FIG. 11, the position registration screen displays the message reading "Please register position." The position registration screen additionally displays a map and a cursor on the map. The position registration screen additionally includes an input field for entering the name of the place corresponding to the cursor on the map. Further, the position registration screen additionally includes the message reading "Does the position require switching to the manner mode?". The position registration screen additionally includes two radio buttons which are "YES" and "NO". The "YES" button is used instruct that the place being registered requires the switching to the manner mode. The "NO" button is used instruct that the place being registered does not require the switching to the manner mode. The position registration screen additionally includes an "Enter" button. At a bush of the "Enter" button, the user can enter and register the inputs having made on this screen.

The CPU 33 detects that the user has made an operation for "registration", based on touch signals fed from the operation unit 8. Upon detection, the CPU 33 updates the position management table by storing the latitude and longitude of the point corresponding to the cursor on the map into the "latitude/longitude" item, and the input made in the "place" field into the "place" item. Further, the CPU sets the "manner mode switch flag" to ON if the "YES" button is selected and to OFF if the "NO" button is selected (Step S16). The CPU 33 then goes back to Step S11.

Figure 12:
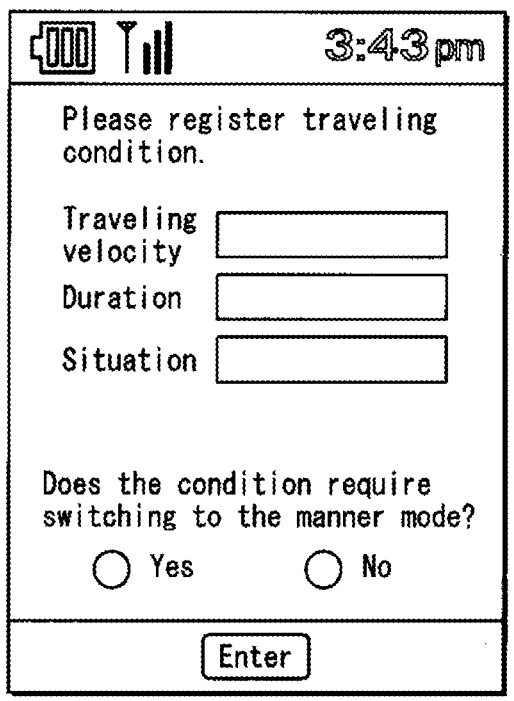
FIG. 12 is a view showing one example of a travel condition setting screen displayed on the main display shown in FIG. 1.

If the user sequentially selects "travel condition" and "OK" on the condition setting screen (S12: VELOCITY), the CPU 33 displays the travel condition setting screen on the main display 5 to allow the user to register a travel condition (Step S17). As shown in FIG. 12, the travel condition setting screen displays the message reading "Please register travel condition. "The schedule registration screen additionally includes input fields for the traveling velocity, duration, and situation of a travel condition to be registered. The travel condition setting screen also displays the message reading "Does the condition require switching to the manner mode?" The travel condition setting screen additionally includes two radio buttons which are "YES" and "NO". The "YES" button is used to instruct that the travel condition being registered requires the switching to the manner mode. The "NO" button is used to instruct that the travel condition being registered does not require the switching to the manner mode. The travel condition setting screen additionally includes an "Enter" button. At a bush of the "Enter" button, the user can enter and register the inputs having made on this screen.

The CPU 33 detects that the user has made an operation for "registration", based on touch signals fed from the operation unit 8. Upon detection, the CPU 33 updates the travel condition management table by storing the inputs made in the "traveling velocity", "duration" and "situation" fields into corresponding items of the travel condition management table. Further, the CPU 33 sets the manner mode switch flag to ON if the "YES" button is selected and to OFF if the "NO" button is selected (Step S18). The CPU 33 then goes back to Step S11.

If the user has selected the "CANCEL" button on the condition setting screen (S12: CANCEL), Step 51 shown in FIG. 7 is performed.

[Manner Mode Switching Process]

Figure 13:
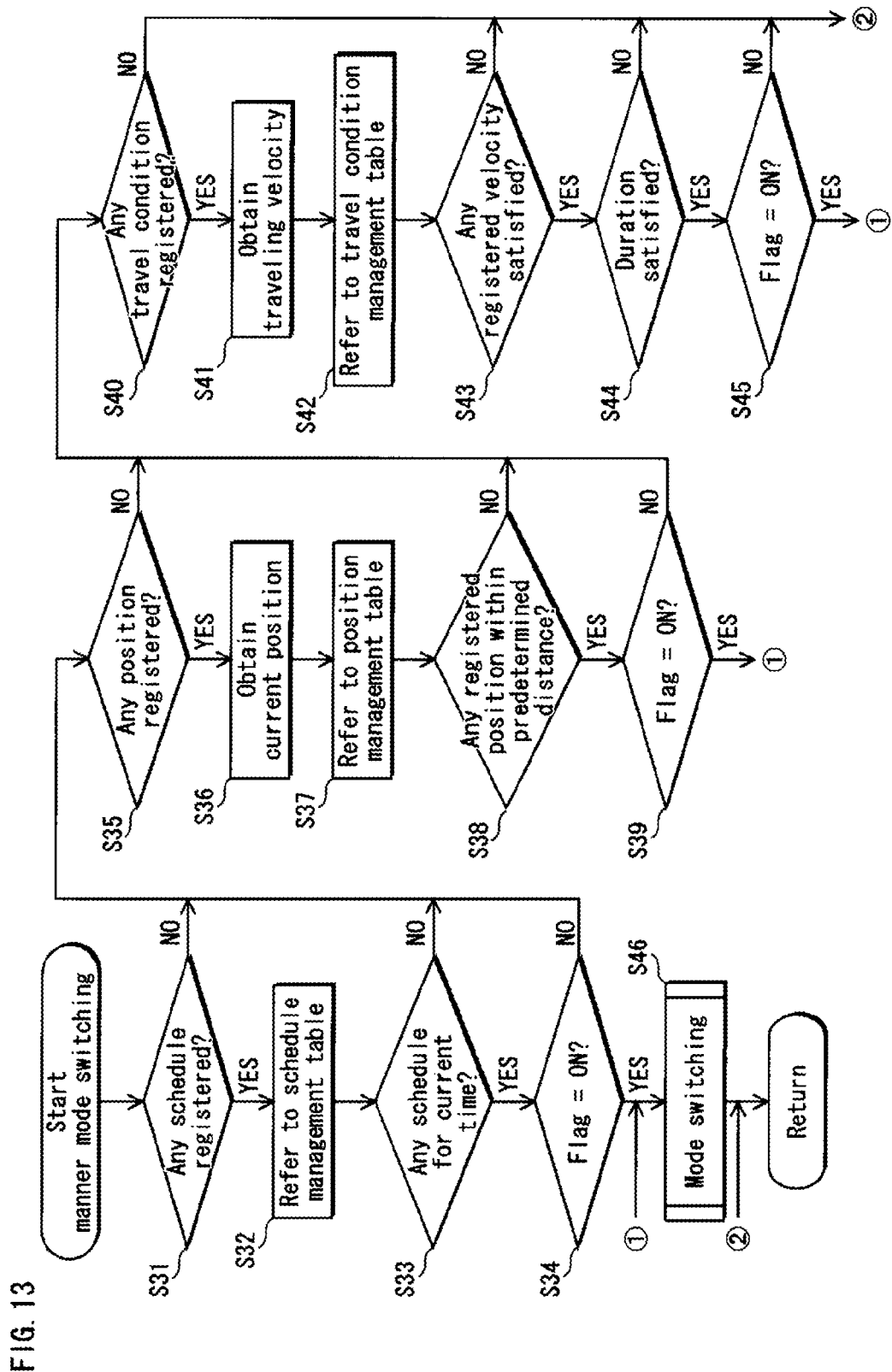
FIG. 13 is a flowchart showing the procedure of a manner mode switching process shown in FIG. 7.

The following describes the manner mode switching process (Step S3) shown in FIG. 7, with reference to FIG. 13. FIG. 13 is a flowchart showing the procedure of the manner mode switching process (Step S3) shown in FIG. 7.

The CPU 33 refers to the schedule management table to judge whether any schedule has been registered (Step S31). If any schedule has been registered (S31: YES), the CPU 33 then searches through the schedule management table for any record having the "start date & time" matching the current time fed from the clock circuit 38 (Step S32). Upon finding a matching record in Step S32 (S33: YES), the CPU 33 then judges whether or not the "manner mode switch flag" of that record is set to "ON" (Step S34). If the "manner mode switch flag" is set to "ON" (S34: YES), the CPU 33 then prompts the user to input an instruction for switching to the manner mode. Upon receipt of a user instruction for switching to the manner mode, the CPU 33 executes the mode switching process (Step S46) to place the mobile phone 1 to the manner mode. Then, Step S1 shown in FIG. 7 is performed.

If no schedule has been registered yet (S31: NO), no matching record is found in Step S32 (S33: NO), or the "manner mode switch flag" is set to "OFF" (S34: NO), the CPU 33 then refers to the position management table to judges whether any position has been registered (Step S35).

If any position has been registered (S35: YES), the CPU 33 obtains the current position (latitude and longitude) of the mobile phone 1 from the GPS signal processing circuit 37 (Step S36). Note that the GPS signal processing circuit 37 constantly measures the current position (latitude and longitude) of the mobile phone 1 based on the radio waves received with the GPS antenna 36. Next, the CPU 33 searches through the position management table for any record having the "latitude/longitude" that falls within a predetermined distance (10 meters, for example) from the current position (latitude and longitude) (Step S37). If any matching record (i.e., a recorded of which the "latitude/longitude" falls within the predetermined distance from the current position) is found in Step S37 (S38: YES), the CPU 33 then judges the "manner mode switch flag" of that record is set to "ON" (Step S39). If the "manner mode switch flag" is set to "ON" (S39: YES), the CPU 33 executes the mode switching process (Step S46). Then, Step Si shown in FIG. 7 is performed.

If no position has been registered yet (S35: NO), no matching record is found in Step S37 (S38: NO), or the "manner mode switch flag" is set to "OFF" (S39: NO), the CPU 33 then refers to the travel condition management table to judges whether any travel condition has been registered (Step S40).

If any travel condition has been registered (S40: YES), the CPU 33 obtains the current traveling velocity from the GPS signal processing circuit 37 (Step S41). As mentioned above, the GPS signal processing circuit 37 measures the current position (latitude and longitude) of the mobile phone 1 based on the radio waves received with the GPS antenna 36. Further, the GPS signal processing circuit 37 measures the traveling velocity of the mobile phone 1 based on the measured positions (latitude and longitude) of the e mobile phone 1 and the times at which the respective positions are measured. Next, the CPU 33 searches through the travel condition management table for any record having the "traveling velocity" that satisfies the current traveling velocity (Step S42). If any matching record (i.e., a record of which the "traveling velocity" satisfied by the current traveling velocity of the mobile phone 1) is found in Step S42 (S43: YES), the CPU 33 resets and restart the timer circuit 39. Then, the CPU 33 continually obtains the current traveling velocity of the mobile phone 1 from the GPS signal processing circuit 37 and also obtains the measured duration of time from the timer circuit 39. Based on the current traveling velocity of the mobile phone 1 and the measured duration of time, the CPU 33 judges whether or not the "traveling velocity" stored in the record is continuously satisfied for the "duration" stored in that record (Step S44). If the traveling velocity of the mobile phone I continuously satisfy the registered traveling velocity for the registered duration (S94: YES), the CPU 33 then judges whether the "manner mode switch flag" of that record is set to "ON" (Step S45). If the "manner mode switch flag" is set to "ON" (S45: YES), the CPU 33 performs the mode switching process (Step S96). Then, Step S1 shown in FIG. 7 is performed.

In no travel condition has been registered yet (S40: NO), no matching record is found in Step S42 (S43: NO), the registered traveling velocity is not continuously satisfied for the registered duration (S44: NO), or the "manner mode switch flag" is set to "OFF" (S45: NO), Step S1 shown in FIG. 7 is performed.

(Mode Switching Process)

Figure 19:
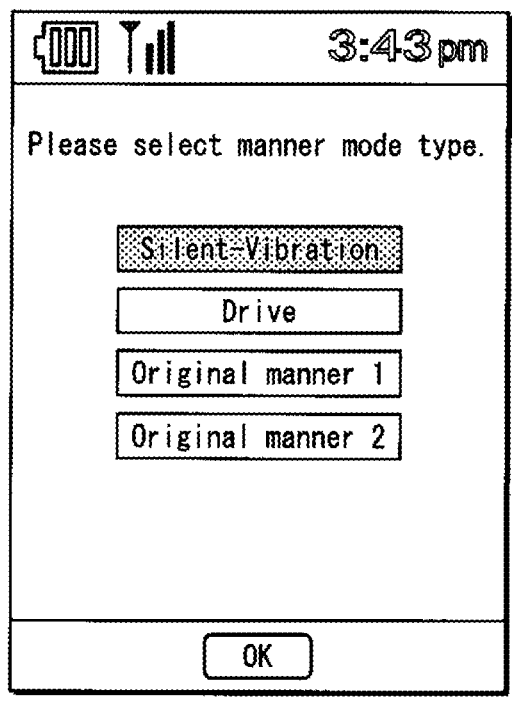
FIG. 19 is a view showing one example of a manner mode type designation screen displayed on the main display shown in FIG. 1.

The following describes the mode switching process (Step S46) shown in FIG. 13, with reference to FIG. 19. FIG. 19 is a flowchart showing the procedure of the mode switching process (Step S46) shown in FIG. 13.

Figure 15:
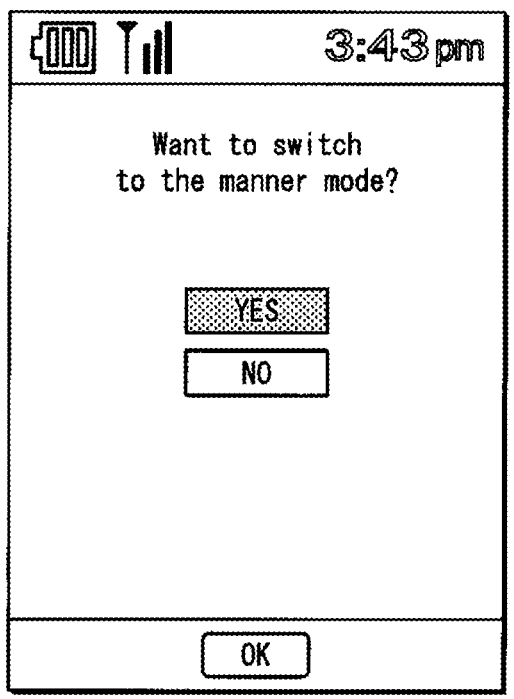
FIG. 15 is a view showing on example of a manner mode switching screen displayed on the main display shown in FIG. 1.

The CPU 33 displays the manner mode switching screen on the main display 5 to prompt the user for an input instructing whether or not to switch to the manner mode (Step S51). As shown in FIG. 15, the manner mode switching screen displays the message reading "(Do you) want to switch to the manner mode?" The manner mode switching screen includes a "YES" button for instructing to switch to the manner mode, a "NO" button for instructing not to switch to the manner mode, and an "OK" button.

The CPU 33 analyzes the user operations made on the manner mode switching screen, based on touch signals fed from the operation unit (Step S52). If the user sequentially selects "YES" and "OK" on the manner mode switching screen, it means that the user instructs to switch to the manner mode (S52: YES). Accordingly, the CPU 33 executes the control for switching the mobile phone 1 to the manner mode (Step S53) and then performs Step Si shown in FIG. 7.

On the other hand, if the user sequentially selects "NO" and "OK" on the manner mode switching screen, it means that the user instructs not to switch to the manner mode (S52: NO). Accordingly, the CPU 33 moves on to Step S1 shown in FIG. 7, without executing the control for switching the mobile phone 1 to the manner mode.

According to the mobile phone 1 described above, the following advantage is achieved. That is, when any of the conditions (schedule, position, and travel condition) set by the user is met for triggering the switching to the manner mode, the mobile phone 1 prompts the user to enter an instruction for approval of the triggered switching to the manner mode. Suppose, for example, the user is scheduled to attend a meeting starting at 15:00 and has set the mobile phone to go into the manner mode according to the schedule. If the meeting is later canceled and thus the switching to the manner mode is no longer necessary, the mobile phone consistent with the present embodiment prompts the user at 15:00, so that the user can select not to activate the manner mode. As a consequence, the user is saved from the trouble of changing the registered schedule before the scheduled time arrives or the trouble of canceling the manner mode after the mobile phone 1 goes into the manner mode as scheduled. As described above, the mobile phone 1 consistent with the present embodiment reduces the labor involved in making user operations.

21 <Second Embodiment>>

The following now describes a mobile phone consistent with a second embodiment of the present invention, with reference to the drawings. As described above, the mobile phone 1 consistent with the first embodiment displays on the main display 5 the manner mode switching screen shown in FIG. 15 to simply prompt the user for an instruction as to whether or not to switch to the manner mode. In contrast, a mobile phone 1 consistent with the present embodiment prompts the user for specifying a type of the manner mode, in addition to an instruction as to whether or not to switch to the manner mode. The following description of the second embodiment mainly relates to the difference with the first embodiment.

<Structure and Functions of Mobile Phone>

According to the second embodiment, the main display 5 displays a manner mode change instruction screen and a manner mode type designation screen. The manner mode change instruction screen is for prompting the user for an instruction as to whether or not to change the manner mode to a different type of a manner mode. The manner mode type designation screen is to prompt the user for an input designating a type of the manner mode to be used. The details of each screen will be described later. According to the present embodiment, the CPU 33 performs a mode switching process shown in FIG. 17, instead of the mode switching process shown in FIG. 14. The operational flow of the mode switching process shown will be described later.

Figure 17:
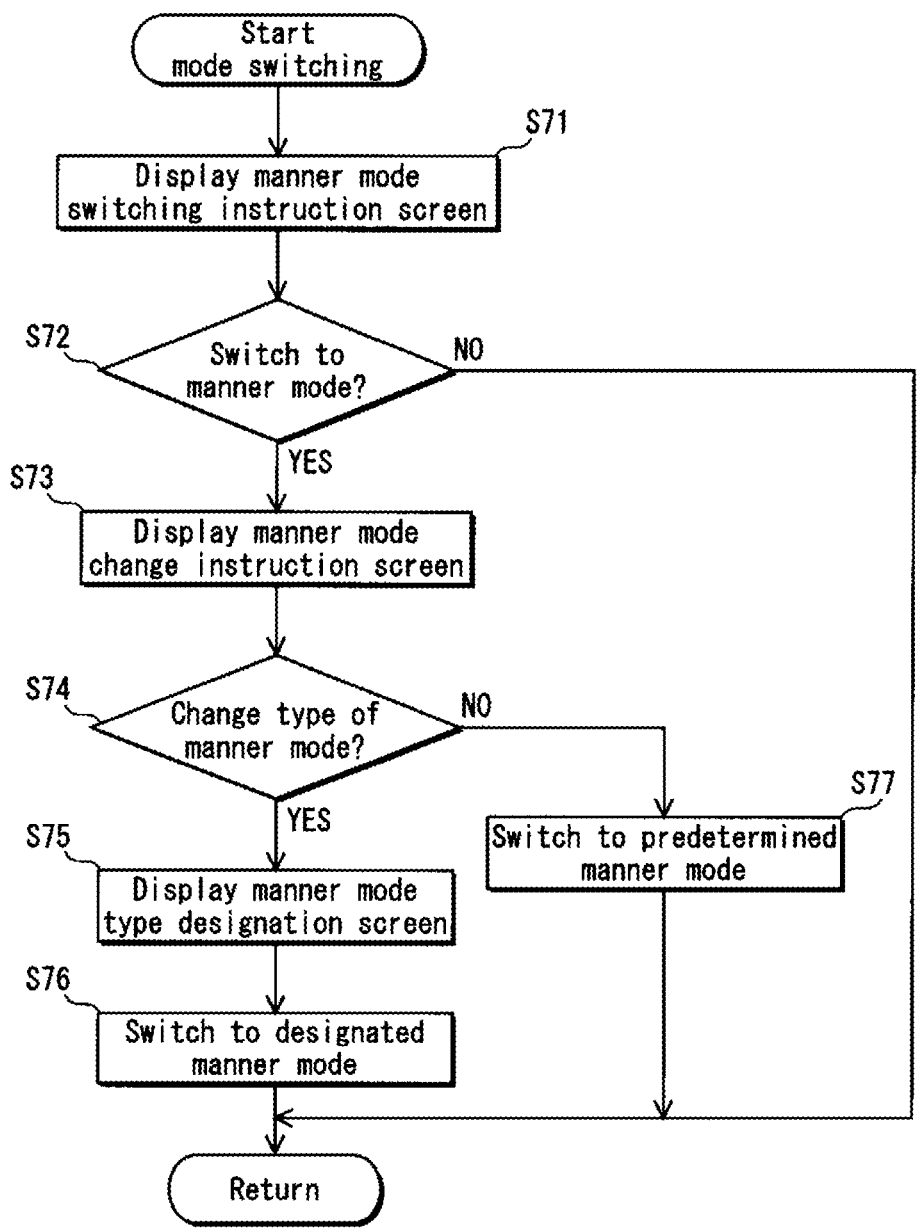
FIG. 17 is a flowchart showing the procedure of a mode switching process consistent with the second embodiment.

According to the second embodiment, in addition, the memory 42 stores a program for causing the mobile phone 1 to execute the mode switching process shown in FIG. 17, instead of the program for causing the mobile phone 1 to execute the mode switching process shown in FIG. 19. Further, the memory 42 stores a function management table used to manage the functions pertaining to the manner mode. FIG. 16 shows one example of the function management table. In the example shown in FIG. 16, the function management table has the following four manner modes which are "silent-vibration", "drive", "original manner 1" and "original manner 2" and stores the settings of the functions pertaining to each manner mode. In the example shown in FIG. 16, the functions pertaining to the manner modes include "ringtone volume", "vibrator", "alarm, volume", "sound effect volume", "voice notifier volume", "easy message memo" and "low-voltage alarm". Note the number of manner modes is not limited to four and may be three or five, for example. In addition, the functions pertaining to the manner modes may additionally include any function other than those shown in FIG. 16 or one or more of the functions shown in FIG. 16 may be omitted.

<Operation of Mobile Phone>

According to the present embodiment, the mobile phone 1 executes the operational flow shown in FIG. 7. In the condition setting process (Step S2) shown in FIG. 7, the operational flow shown in FIG. 8 is executed. In the manner mode switching process (Step S3) shown in FIG. 7, the operational flow shown in FIG. 13 is executed. In the mode switching process (Step S46) shown in FIG. 13, the operational flow shown in FIG. 17 is executed.

(Mode Switching Process)

The following describes the mode switching process (Step S46) shown in FIG. 13 consistent with the present embodiment, with reference to FIG. 17. FIG. 17 is a flowchart showing the procedure of the mode switching process executed by the mobile phone 1 consistent with the present embodiment.

The CPU 33 displays the manner mode switching screen on the main display 5 (Step S71) and analyzes user operations made on the manner mode switching screen, based on touch signals fed from the operation unit 8 (Step S72). If the user sequentially selects "NO" and "OK" on the manner mode switching screen, it means that the user instructs not to switch to the manner mode (S72: NO). Accordingly, the CPU 33 moves on to Step Si shown in FIG. 7, without executing the control for switching to the manner mode.

Figure 18:
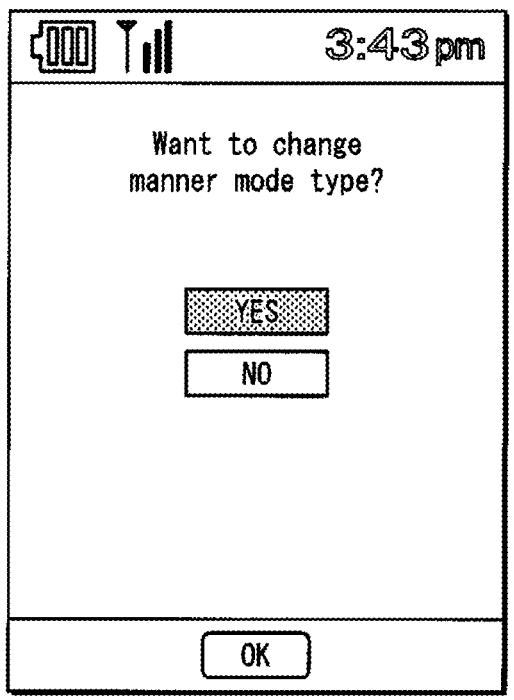
FIG. 18 is a view showing one example of a manner mode change instruction screen displayed on the main display shown in FIG. 1.

On the other hand, if the user sequentially selects "YES" and "OK" on the manner mode switching screen, it means that the user instructs to switch to a manner mode (S72: YES). Then, the CPU 33 displays the manner mode change instruction screen on the main display 5 to prompt the user for instruction as to whether or not to change the manner mode to a different type of manner mode (Step S73). As shown in FIG. 18, the manner mode change instruction screen displays the message reading "(Do you) want to change manner mode type?" The manner mode change instruction screen includes a "YES" button for instructing to change the manner mode type, a "NO" button for instructing not to change the manner mode type, and an "OK" button.

The CPU 33 analyzes user operations made on the manner mode change instruction screen, based on touch signals fed from the operation unit 8 (Step S74). If the user sequentially selects "YES" and "OK" on the manner mode change instruction screen, it means that the user instructs to change the manner mode type (S74: YES). Accordingly, the CPU 33 displays a manner mode type designation screen on the main display 5, to prompt the user for an instruction designating a manner mode (Step S75). As shown in FIG. 19, the manner mode type designation screen displays the message reading "Please select manner mode type." In the example shown in FIG. 19, the manner mode type designation screen includes the following four buttons each corresponding to a type of manner mode as a candidate: "silent-vibration" button, "drive" button, "original manner 1" button, and "original manner 2" button. The manner mode type designation screen additionally includes an "OK" button. For example, the types of manner modes being candidates for a manner mode to be selected correspond to the types of manner modes stored in the function management table held in the memory 42.

The CPU 33 analyzes user operations made on the manner mode type designation screen, based on touch signals fed from the operation unit 8. If the user selects one of the manner modes and then selects "OK", the CPU 33 executes the control for switching the mobile phone 1 into the selected one of the manner modes (Step S76). Then, Step Si shown in FIG. 7 is performed. For example, when the user sequentially selects "silent-vibration" and "OK" on the manner mode type designation screen, the CPU 33 executes the control for switching the mobile phone 1 into the "silent-vibration" manner mode.

If the user sequentially selects "NO" and "OK" on the manner mode change instruction screen, it means that the user instructs not to change the manner mode type (S74: NO). In this case, the CPU 33 executes the control for switching the mobile phone 1 into a predetermined manner mode (Step S77). Then, Step Si shown in FIG. 7 is performed.

The mobile phone 1 consistent with the present embodiment described above further achieves advantages including the following, in addition to the advantage achieved by the mobile phone 1 consistent with the first embodiment.

That is, before going into a manner mode, the mobile phone 1 allows the user to select a manner mode from among a plurality of types of manner modes. Suppose, for example, that the "silent-vibration" manner mode is selected in advance. Even so, the user is allowed to select the "drive" manner mode, which the user feels more suitable for the current situation, without much labor involved in making user operations.

<<Third Embodiment>>

The following now describes a mobile phone consistent with a third embodiment of the present invention, with reference to the drawings. As described above, the mobile phone 1 consistent with the first embodiment displays on the main display 5 the manner mode switching screen shown in FIG. 15 to simply prompt the user for an instruction as to whether or not to switch to the manner mode. In contrast, a mobile phone 1 consistent with the present embodiment prompts the user for an instruction as to the settings of the manner mode, in addition to an instruction as to whether or not to switch to the manner mode. The settings of a manner mode include the setting pertaining to various functions, such as the ringtone volume, vibrator, easy message memo (i.e., voice mail). Note that the following description of the third embodiment mainly relates to the difference with the first embodiment.

<Structure and Functions of Mobile Phone>

The main display 5 appropriately displays the following screens one by one. One is an answering message change instruction screen for allowing the user to instruct as to whether or not to change the answering message used in the easy message memo (i.e., voice mail) function. Another is an answering message type designation screen allowing the user to designate the type of answering message to be used. Yet another is a vibrator setting change screen allowing the user to change the vibrator settings. The details of each screen will be given later. According to the present embodiment, the CPU 33 performs a mode switching process shown in FIG. 20, instead of the mode switching process shown in FIG. 14. The operational flow of the mode switching process will be described later. In addition, the memory 42 stores a program for causing the mobile phone 1 to execute the mode switching process shown in FIG. 20, instead of the program for causing the mobile phone 1 to execute the mode switching process shown in FIG. 14.

<Operation of Mobile Phone>

According to the present embodiment, the mobile phone 1 executes the operational flow shown in FIG. 7. In the condition setting process (Step S2) shown in FIG. 7, the operational flow shown in FIG. 8 is executed. In the manner mode switching process (Step S3) shown in FIG. 7, the operational flow shown in FIG. 13 is executed. In the mode switching process (Step S46) shown in FIG. 13, the operational flow shown in FIG. 20 is executed.

(Mode Switching Process)

Figure 20:
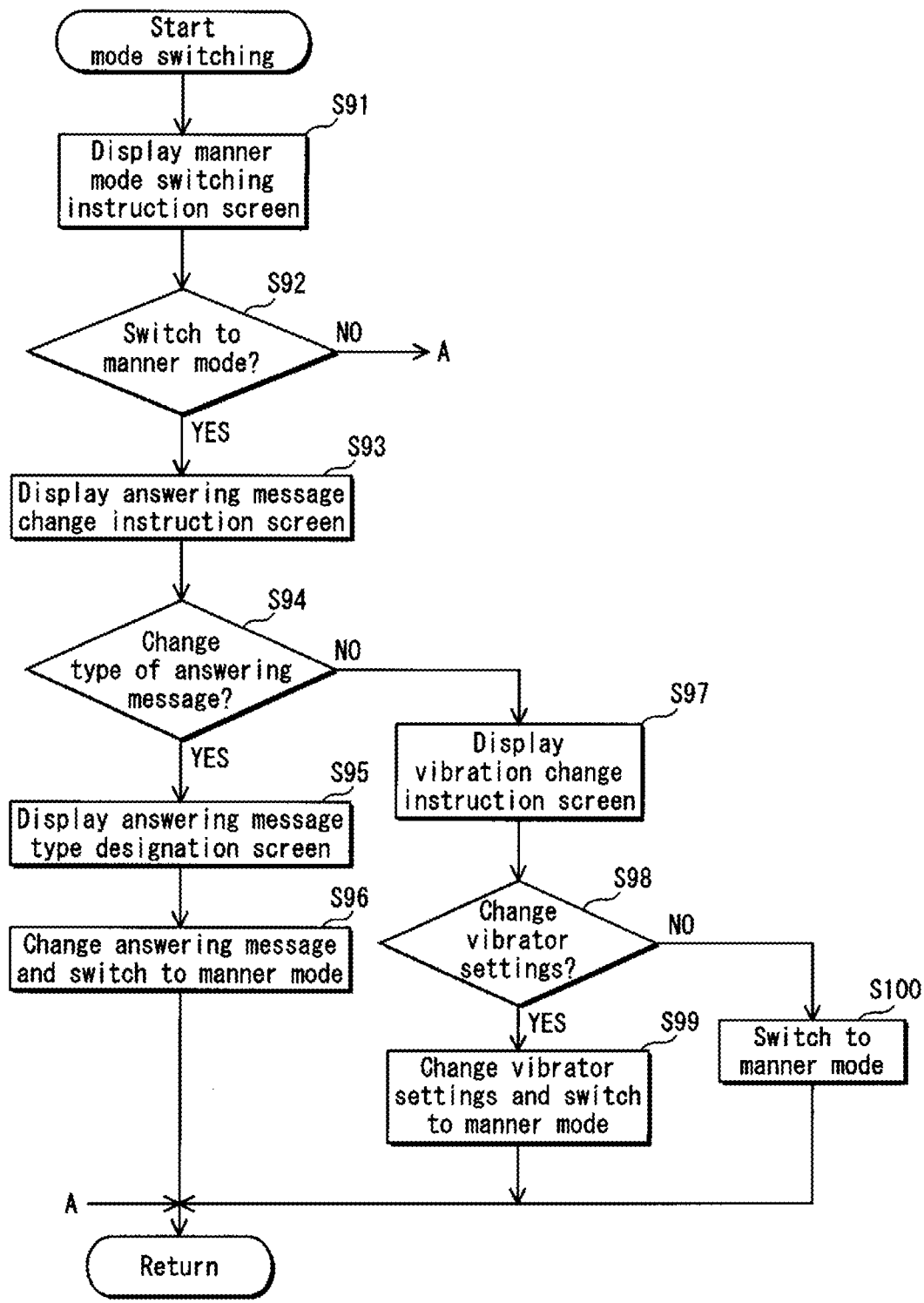
FIG. 20 is a flowchart showing the procedure of a mode switching process consistent with a third embodiment.

The following describes the mode switching process (Step S46) shown in FIG. 13 consistent with the present embodiment, with reference to FIG. 20. FIG. 20 is a flowchart showing the procedure of the mode switching process executed by the mobile phone 1 consistent with the present embodiment.

The CPU 33 displays the manner mode switching screen on the main display 5 (Step S91) and analyzes user operations made on the manner mode switching screen, based on touch signals fed from the operation unit 8 (Step S92). If the user sequentially selects "NO" and "OK" on the manner mode switching screen, it means that the user instructs not to switch to the manner mode (S92: NO). Accordingly, the CPU 33 moves on to Step S1 shown in FIG. 7, without executing the control for switching the mobile phone 1 into the manner mode.

Figure 21:
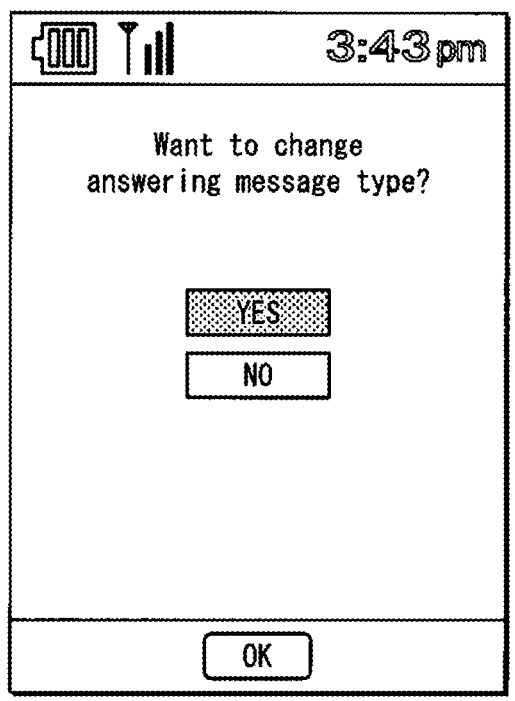
FIG. 21 is a view showing one example of an answering message change instruction screen displayed on the main display shown in FIG. 1.

On the other hand, if the user sequentially selects "YES" and "OK" on the manner mode switching screen, it means that the user instructs to switch to the manner mode (S92: YES). Accordingly, the CPU 33 displays the answering message change instruction screen on the main display 5 to prompt the user for an instruction as to whether or not to change the type of answering message used in the voice mail function (Step S93). As shown in FIG. 21, the answering message change instruction screen displays the message reading "(Do you) want to change answering message type?". The answering message change instruction screen includes a "YES" button for instructing to change the answering message type, a "NO" button for instructing not to change the answering message type, and an "OK" button.

Figure 22:
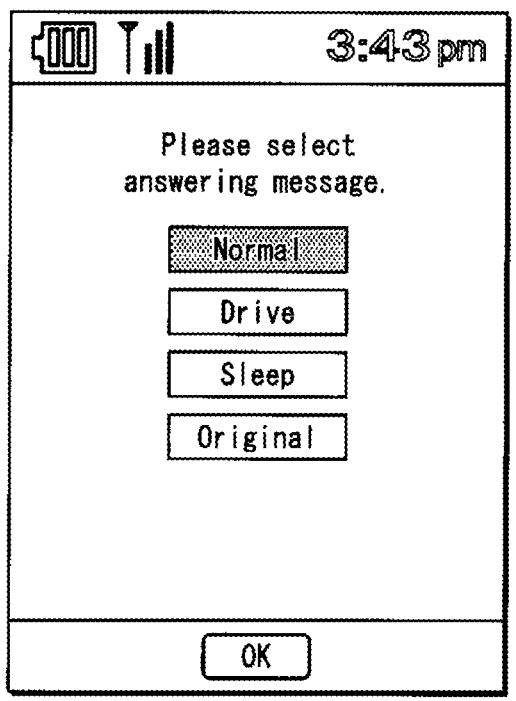
FIG. 22 is a view showing one example of an answering message type designation screen displayed on the main display shown in FIG. 1.

The CPU 33 analyzes user operations made on the answering message change instruction screen, based on touch signals fed from the operation unit 8 (Step S94). If the user sequentially selects "YES" and "OK" on the answering message change instruction screen, it means that the user instructs to change the answering message type (S94: YES). Accordingly, the CPU 33 displays the answering message type designation screen on the main display 5 to prompt the user for an instruction designation one of the answering messages to be used (Step S95). As shown in FIG. 22, the answering message type designation screen displays the message reading "Please select answering message." In the example shown in FIG. 22, the answering message type designation screen includes "normal" button, "drive" button", "sleep" button and "original" button, which corresponds to candidates for an answering message to be used. The answering message type designation screen additionally includes an "OK" button. Note that the usable types of answering messages are not limited to the specific examples shown in FIG. 22.

The CPU 33 analyzes user operations made on the answering message type designation screen, based on touch signals fed from the operation unit 8. If the user selects any of the answering messages and then selects "OK" on the answering message type designation screen, the CPU 33 updates the settings of the predetermined functions pertaining to the manner mode, by changing the type of the answering message to the one selected by the user. The CPU 33 then executes the control for switching the mobile phone 1 into the manner mode (Step S96). Then, Step S1 shown in FIG. 7 is performed. Suppose, for example, the user selects "drive" as an answering message and then selects "OK" on the answering message type designation screen. In this case, the CPU 33 changes the answering message type to the one corresponding to the "drive" mode and then executes the control for switching the mobile phone 1 into the manner mode.

Figure 23:
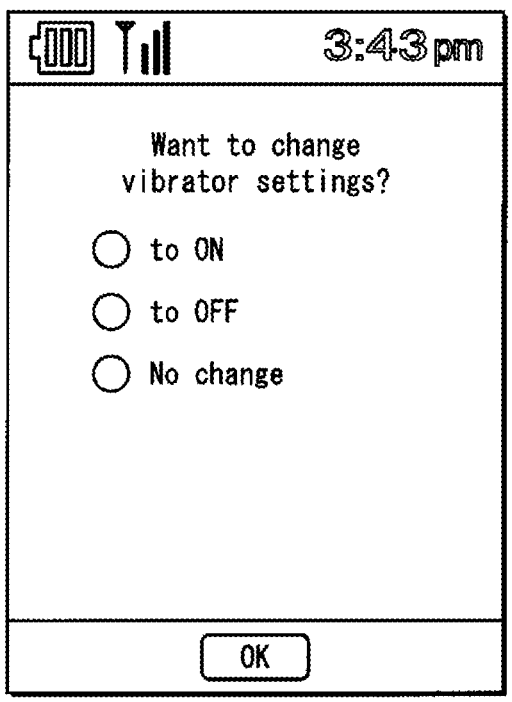
FIG. 23 is a view showing one example of a vibrator setting change screen displayed on the main display shown in FIG. 1.

If the user sequentially selects "NO" and "OK" on the answering message change instruction screen, it means that the user instructs not to change answering message (S94: NO). Accordingly, the CPU 33 displays the vibrator setting change screen on the main display 5 to prompt the user for an instruction as to whether or not to change the vibrator settings (Step S97). As shown in FIG. 23, the vibrator setting change screen displays the message reading "(Do you) want to change vibrator settings?" The vibrator setting change screen includes a radio button used to set the vibrator to ON, a radio button used to set the vibrator to OFF, and a radio button used to leave the current vibrator settings unchanged. The vibrator setting change screen additionally includes an "OK" button.

The CPU 33 analyzes user operations made on the vibrator setting change screen, based on touch signals fed from the operation unit 8 (Step S98). If the user sequentially selects either of the "to ON" and "to OFF" radio buttons and "OK" button (S98: YES), the CPU 33 updates the settings of the predetermined functions pertaining to the manner mode, by changing the vibrator settings according to the user selection (ON or OFF). The CPU 33 then executes the control for switching the mobile phone 1 into the manner mode (Step S99), followed by Step S1 shown in FIG. 7.

On the other hand, if the user sequentially selects the "No change" radio button and the "OK" button (S98: NO), the CPU 33 executes the control for switching the mobile phone 1 into the predetermined manner mode (Step S100). Then, Step Si shown in FIG. 7 is performed.

The mobile phone 1 consistent with the present embodiment described above further achieves advantages including the following, in addition to the advantage achieved by the mobile phone 1 consistent with the first embodiment.

That is, before going into a manner mode, the mobile phone 1 allows the user to change the settings of the functions pertaining to the manner mode. Suppose, for example, the manner mode is initially set so that the voice mail function is executed with the use of the "normal" answering message. Even so, the answering message can be changed to "drive", which the user feels more suitable for the current situation, without much labor involved in making user operations.

<<Supplemental Note>>

The present invention is not limited to the specific embodiments described above and may be practiced in various other embodiments and modifications including the following, as long as the objects of the present invention and their attendant or relevant objects are achieved.

Figure 14:
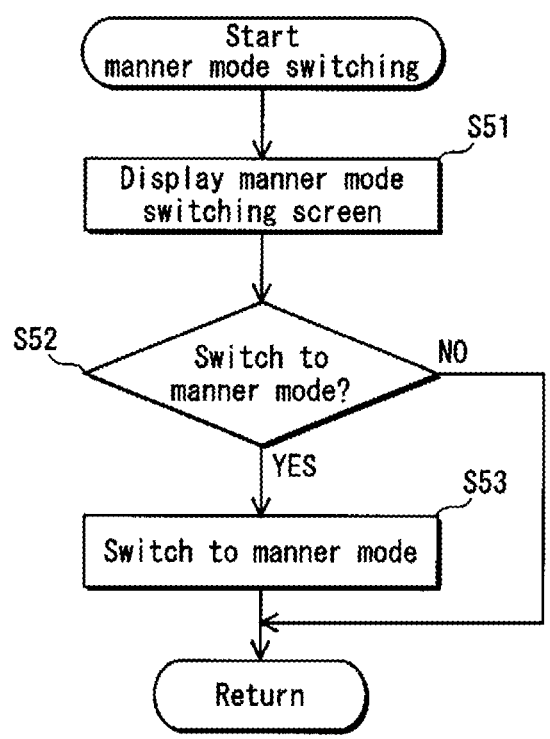
FIG. 14 is a flowchart showing the procedure of a mode switching process shown in FIG. 13.

(1) According to the first to third embodiments described above, the main display 5 is used to display the respective screens during the manner mode switching process (FIG. 13) and the mode switching processes (FIGS. 14, 17, and 20). However, this is merely one example and without limitation. Each screen may be displayed on the sub-display 6 instead of on the main display 5. In this case, the CPU 33 analyzes user operations based on the coordinates fed from the touch sensor 6a. Note, for example, that the sub-display 6 may be modified to display a respective screen at the brightness level lower than that of the normal display.

(2) According to the first to third embodiments described above, the CPU 33 obtains the current position and current traveling velocity of the mobile phone 1 from the GPS signal processing circuit 37. Yet, the mobile phone 1 may include another unit capable of detecting the current position and the current traveling velocity of the mobile phone 1, so that the current position and the traveling velocity may be obtained from such a unit.

(3) According to the first to third embodiments described above, the mobile phone I goes into a predetermined type of manner mode, unless the change to another type of manner mode is specifically instructed by the user. However, this is merely one example and without limitation. For example, the memory 42 may store a plurality of types of manner modes each associated with a schedule, a position, or a travel condition. In the case where the user approves the switching to a manner mode triggered by a specific schedule, the mobile phone 1 may be set to go into the manner mode associated with the specific schedule as stored in the memory 42.

Further, each of the schedule management table, position management table and travel condition management table may be modified to add the item "manner mode type". At the time of registering a new record into any of the tables, the user is allowed to select a type of manner mode and the manner mode type selected by the user is entered to the "manner mode type" of the table. When an event triggers switching to a manner mode, the mobile phone 1 goes into the specific manner mode stored in the "manner mode type" of the record corresponding to the event.

(4) The mobile phone 1 according to the first to third embodiments described above may be modified in the following manner. That is, the timer circuit 39 may start measuring the duration of time at a predetermined point in time. When the measured duration of time reaches a predetermined time period, the CPU 33 prompts for an instruction regarding the switching to a manner mode (by displaying the screen shown in FIG. 15, for example). Then, in response to a user instruction to switch to the manner mode, the mobile phone 1 executes the control to switch to the manner mode.

Suppose, for example, that the user sets the mobile phone to switch to a manner mode 30 minutes after the setting. Then, the CPU 33 resets and restarts the timer circuit 39. When the duration of time measured by the timer circuit 39 reaches 30 minutes, the CPU 33 displays the screen shown, for example, in FIG. 15 to prompt the user for an instruction as to whether or not to switch to the manner mode.

(5) The first to third embodiments described above may be modified by omitting Step S44 shown in FIG. 13 and adding Step S45 after Step S43. That is, if any record of the travel condition management table has the "traveling velocity" satisfied by the traveling velocity fed from the GPS signal processing circuit 37, the CPU 33 prompts the user for an instruction as to whether or not to switch to the manner mode (by displaying the screen shown in FIG. 15, for example).

(6) The first to third embodiments described above may be modified by replacing the judgment made in Step S38 shown in FIG. 13 with a judgment as to whether or not the current location of the mobile phone 1 coincides with any of the registered position. If the judgment results in the affirmative, Step S39 is performed. If not, Step S40 is performed.

(7) The first to third embodiments described above may be modified as follows. That is, a user instruction as to whether or not to switch to the manner may be requested by using the LED or the like provided on the casing of the mobile phone 1, instead of displaying a screen prompting for the instruction (such as the screen shown in FIG. 15) on the main display 5 or the sub-display 6. More specifically, the LED or the like may be caused to illuminate in a predetermined color (red, for example). In this case, a further modification may be made to allow the user to give an instruction regarding the manner mode by shaking the mobile phone 1 up and down. The CPU 33 analysis the user instruction based on the acceleration values in the thee axes fed from the acceleration sensor 40. In this case, a further modification may be made, so that the illumination color of the LED or the like changes from red to blue, for example, at the time when the mobile phone 1 goes into the manner mode in response to the user instruction. This modification results in an advantage of visually notifying the user about the switching to the manner mode.

Note that the mobile phone 1 may be a bar-type mobile phone. In this case, the mobile phone 1 may request a user instruction regarding the switching to a manner mode, by turning ON the specific LEDs provided to illuminate the display.

(8) The first to third embodiments described above may be modified to add a step to be performed after the judgment in Step S34, S39 or S45 shown in FIG. 13 results in YES or after Step S51 shown in FIG. 14. In the additional step, a process is performed to inform the user that the condition for switching to the manner mode is met. One way to inform the user is vibration of the vibrator 41.

(9) The first to third embodiments described above may be modified to provide the mobile phone 1 with an additional function regarding the cancellation of the manner mode. That is, before canceling the manner mode, the mobile phone 1 may request a user instruction as to whether or not to cancel the manner mode. The cancellation of the manner mode is carried out in response to the user instruction for approving the cancellation.

Suppose, for example, a schedule is registered such that a progress meeting will be held at the meeting room A from 15:00 to 16:00 on September 25. Accordingly, the mobile phone 1 is triggered by the registered schedule to go into a manner mode at an appropriate time. Then, when the current time of day reaches 16:00, which is the "end date & time" stored in the record of the schedule in the schedule management table having been triggered the switching to the manner mode, the CPU 33 displays the message reading "Do you want to cancel manner mode?" on the main display 5. The manner mode is cancelled in response to a user operation made on the operation unit 8 to approve the cancellation. In other words, the manner mode is not cancelled unless the specific user operation to cancel the manner mode is received. This modification ensures to avoid automatically cancelling the manner mode despite that the meeting is extended.

(10) A program for implementing one or more of the operational flows described above in the first to third embodiments may be stored into a medium such as CD-ROM or distributed via electric telecommunication line.

INDUSTRIAL APPLICABILITY

The present invention is applicable to mobile information apparatuses having a manner mode function.

The invention claimed is:
1. A mobile information apparatus, comprising:
a time setting module operable to set a specific time of day;
a clock module operable to output a time of day;
a request module operable to request an instruction from a user as to whether or not to perform a switching to a manner mode when the time of day output from the clock module reaches the specific time of day set by the time setting module;
a receiving module operable to receive an instruction given by a user in response to the request by the request module;
a control module operable to control the mobile information apparatus to switch to the manner mode when the receiving module receives the instruction to switch to the manner mode; and
a control module operable to control the mobile information apparatus to maintain a current mode when the receiving module receives the instruction not to switch to the manner mode.

2. A mobile information apparatus, comprising:
a duration measuring module operable to measure a duration of time from a specific point in time;
a request module operable to request an instruction from a user as to whether or not to perform a switching to a manner mode when the duration of time measured by the duration measuring module reaches the predetermined duration;
a receiving module operable to receive an instruction given by a user in response to the request by the request module;
a control module operable to control the mobile information apparatus to switch to the manner mode when the receiving module receives the instruction to switch to the manner mode; and
a control module operable to control the mobile information apparatus to maintain a current mode when the receiving module receives the instruction not to switch to the manner mode.

3. A non-transitory computer-readable medium which stores a manner mode switching program to be executed by a module information apparatus having a time setting module operable to set a specific time of day and a clock module operable to output a time of day, the program comprising code operable to cause the mobile information apparatus to perform:
requesting an instruction from a user as to whether or not to perform a switching to a manner mode when the time of day output from the clock module reaches the specific time of day set by the time setting module;
receiving an instruction given by a user in response to the request by the requesting step; and
controlling the mobile information apparatus to switch to the manner mode when the receiving step receives the instruction to switch to the manner mode,
wherein the program further comprises code operable to cause the mobile information apparatus to perform:
controlling the mobile information apparatus to maintain a current mode when the receiving step receives the instruction not to switch to the manner mode.

4. A non-transitory computer-readable medium which stores a manner mode switching program to be executed by a module information apparatus having a duration measuring module operable to measure a duration of time from a specific point in time, the program comprising code operable to cause the mobile information apparatus to perform:
requesting an instruction from a user as to whether or not to perform a switching to a manner mode when the duration of time measured by the duration measuring module reaches the predetermined duration;
receiving an instruction given by a user in response to the request by the requesting step; and
controlling the mobile information apparatus to switch to the manner mode when the receiving step receives the instruction to switch to the manner mode,
wherein the program further comprises code operable to cause the mobile information apparatus to perform:
controlling the mobile information apparatus to maintain a current mode when the receiving step receives the instruction not to switch to the manner mode.

* * * * *